United States Patent
Righi et al.

(10) Patent No.: US 8,352,721 B1
(45) Date of Patent: *Jan. 8, 2013

(54) INITIATING AN OPERATING SYSTEM BOOT FROM FIRMWARE

(75) Inventors: Stefano Righi, Lawrenceville, GA (US); Natalya Kalistratova, Duluth, GA (US)

(73) Assignee: American Megatrends, Inc., Norcross, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/208,665

(22) Filed: Aug. 12, 2011

Related U.S. Application Data (63) Continuation of application No. 11/758,982, filed on Jun. 6, 2007, now Pat. No. 8,028,155.

(51) Int. Cl.
*G06F 9/00* (2006.01)

(52) U.S. Cl. .................................. 713/2; 713/1; 714/36

(58) Field of Classification Search .................. 713/1, 2; 714/36

See application file for complete search history.

(56) References Cited

U.S. PATENT DOCUMENTS

| | | | |
|---|---|---|---|
| 5,519,870 A | 5/1996 | Kannan et al. | |
| 6,212,632 B1 | 4/2001 | Surine et al. | |
| 6,317,828 B1 | 11/2001 | Nunn | |
| 6,591,376 B1 | 7/2003 | VanRooven et al. | |
| 6,622,244 B1 | 9/2003 | Eidson et al. | |
| 6,760,827 B2 | 7/2004 | Moore | |
| 6,763,457 B1 | 7/2004 | Aguilar et al. | |
| 6,839,835 B2 | 1/2005 | Kawade et al. | |
| 6,957,328 B2 | 10/2005 | Goodman et al. | |
| 6,990,685 B1 | 1/2006 | Christensen et al. | |
| 7,120,778 B2 | 10/2006 | Zimmer | |
| 7,146,512 B2 | 12/2006 | Rothman et al. | |
| 7,191,327 B2 | 3/2007 | Viljoen et al. | |
| 7,234,051 B2 | 6/2007 | Munguia et al. | |
| 7,240,190 B2 | 7/2007 | Lai | |
| 7,318,149 B2 | 1/2008 | Cepulis et al. | |
| 7,519,805 B2 | 4/2009 | Krauss | |
| 7,543,048 B2 | 6/2009 | Rothman et al. | |
| 7,698,547 B1 | 4/2010 | Polyudov | |
| 2002/0091917 A1 | 7/2002 | Liao | |
| 2002/0169950 A1 | 11/2002 | Esfahani et al. | |
| 2003/0009654 A1 | 1/2003 | Nalawadi et al. | |
| 2003/0188173 A1 | 10/2003 | Zimmer et al. | |
| 2004/0243385 A1 | 12/2004 | Rothman et al. | |
| 2004/0260917 A1 | 12/2004 | Edrich | |
| 2005/0027908 A1 | 2/2005 | Ong et al. | |
| 2005/0216715 A1* | 9/2005 | Matheny et al. | 713/1 |
| 2005/0268081 A1 | 12/2005 | Han et al. | |

(Continued)

OTHER PUBLICATIONS

BIOS Boot Specification. Version 1.01. Jan. 11,1996, Compaq, Intel.*

(Continued)

*Primary Examiner* — Paul Yanchus, III
*Assistant Examiner* — Zahid Choudhury
(74) *Attorney, Agent, or Firm* — Hope Baldauff Hartman, LLC (57) ABSTRACT

A computer system firmware stores an operating system boot loader along with accompanying firmware boot driver and a service option ROM. A firmware boot enables the computer system to initiate an operating system boot without necessarily utilizing a hard drive or other peripheral. The service option ROM is installed, indicating to the firmware that a firmware boot is available. When selected the firmware boot copies the operating system boot loader from firmware to main memory and then initiates the operating system boot loader.

14 Claims, 6 Drawing Sheets

U.S. PATENT DOCUMENTS

| | | |
|---|---|---|
| 2006/0031654 A1 | 2/2006 | Liang |
| 2006/0031664 A1 | 2/2006 | Wilson et al. |
| 2006/0059327 A1 | 3/2006 | Brown et al. |
| 2006/0101310 A1 | 5/2006 | Diamant et al. |
| 2006/0129824 A1 | 6/2006 | Hoff et al. |
| 2006/0174099 A1 | 8/2006 | Wang |
| 2006/0218387 A1 | 9/2006 | Fu et al. |
| 2006/0242398 A1 | 10/2006 | Fontijn et al. |
| 2007/0022281 A1 | 1/2007 | Haustein et al. |
| 2007/0028085 A1 | 2/2007 | Inohiza |
| 2007/0043938 A1 | 2/2007 | May et al. |
| 2007/0101116 A1 | 5/2007 | Tsuji |
| 2007/0113067 A1 | 5/2007 | Oh et al. |
| 2007/0186091 A1 | 8/2007 | Yang et al. |
| 2007/0239977 A1 | 10/2007 | Wu |
| 2007/0260867 A1 | 11/2007 | Ethier et al. |
| 2008/0005270 A1 | 1/2008 | Leigh et al. |
| 2008/0005551 A1 | 1/2008 | Swanson et al. |
| 2008/0082810 A1 | 4/2008 | Cepulis et al. |
| 2008/0313453 A1 | 12/2008 | Booth et al. |
| 2009/0037720 A1 | 2/2009 | Cho |

OTHER PUBLICATIONS

U.S. Official Action dated Feb. 3, 2010 in U.S. Appl. No. 11/758,982, filed Jun. 6, 2007, First Named Inventor: Stefano Righi.

U.S. Official Action dated Jun. 23, 2010 in U.S. Appl. No. 11/758,982, filed Jun. 6, 2007, First Named Inventor: Stefano Righi.

U.S. Official Action dated Dec. 8, 2010 in U.S. Appl. No. 11/758,982, filed Jun. 6, 2007, First Named Inventor: Stefano Righi.

U.S. Notice of Allowance/Allowability dated May 18, 2011 in U.S. Appl. No. 11/758,982, filed Jun. 6, 2007, First Named Inventor: Stefano Righi.

* cited by examiner

INITIATING AN OPERATING SYSTEM BOOT FROM FIRMWARE

CROSS-REFERENCE TO RELATED APPLICATIONS

This application is a continuation of U.S. patent application Ser. No. 11/758,982 filed Jun. 6, 2007 now U.S. Pat. No. 8,028,155, entitled "Initiating an Operating System Boot from Firmware," now U.S. Pat. No. 8,028,155, which is hereby incorporated by reference in its entirety.

BACKGROUND

Computer systems are known that utilize a firmware program stored in non-volatile memory to assist with the startup of the computer system and to enable communication with low-level hardware, preparing the way for other programs to execute. For instance, some computer systems utilize a basic input/output system (BIOS) and/or an extensible firmware interface (EFI) firmware that includes program code containing fundamental routines that help transfer information between elements within the computer system. Among other tasks, the program code stored in firmware discovers and initializes components within and connected to the computer system. These components may include a multitude of devices capable of loading a computer's initial program such as an operating system. These initial program load (IPL) devices may include floppy disk drives, hard drives, optical drives, network controllers, and universal serial bus (USB) drives. In many cases, IPL devices store and serve up the program code comprising an operating system such as Linux.

Many computer systems include multiple IPL devices, allowing for multiple sources from which an operating system or other initial program can be loaded. For example, if the firmware in the computer system cannot successfully load an operating system from a floppy disk, it may next attempt to load the operating system from a hard disk, and so on. However, if one or more IPL devices are not discovered, are corrupted, or are otherwise malfunctioning, then an operating system boot cannot be initiated. Moreover, a user may desire to initiate an operating system boot independent of any attached IPL devices in certain situations, but this is not presently possible.

It is with respect to these considerations and others that embodiments presented herein have been made.

SUMMARY

It should be appreciated that this Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Provided are methods and computer-readable media for initiating an operating system boot from a firmware. Typically, hard drives and floppy drives are the source of an operating system boot loader. Here, a service or virtual option read-only memory (ROM) that is not associated with any hard drive or other peripheral is loaded into the computer's memory from firmware. When a firmware boot is requested or required, a firmware boot driver including an operating system boot loader is retrieved from the firmware. The operating system boot loader (e.g., GRand Unified Bootloader for Linux, or GRUB) is then executed, which eventually loads and boots the operating system itself.

Also provided are computer-readable media storing various modules. The modules include a service option ROM that is similar to a hardware option ROM associated with standard initial program load (IPL) devices. The service option ROM indicates the availability of a firmware boot, an operating system boot loader, and firmware boot driver having instructions to create a firmware boot event and instructions to copy the operating system boot loader from firmware to memory.

Other methods and/or computer-readable media according to embodiments will be or become apparent to one with skill in the art upon review of the following drawings and Detailed Description. It is intended that all such additional methods and/or computer-readable media be included within this description, be within the scope of the present invention, and be protected by the accompanying claims.

DETAILED DESCRIPTION

The following detailed description is directed to apparatuses and methods for initiating an operating system boot from a firmware. In the following detailed description, references are made to the accompanying drawings that form a part hereof, and which are shown, by way of illustration, using specific embodiments or examples. Referring now to the drawings, in which like numerals represent like elements through the several figures, aspects of the various implementations and an illustrative operating environment provided herein will be described.

Figure 1:
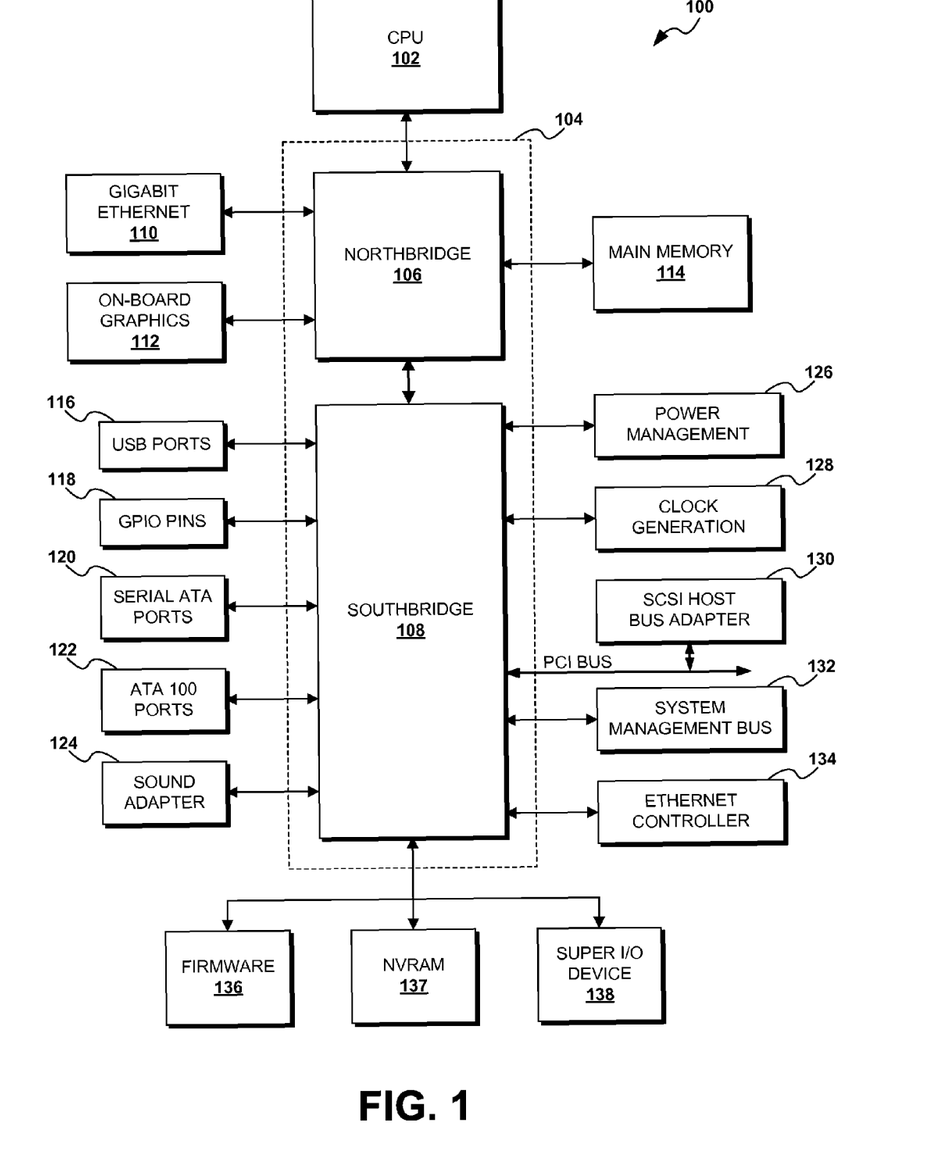
FIG. 1 is a computer architecture diagram that illustrates various components of a computer that provides an illustrative operating environment according to embodiments.

FIG. 1 and the following discussion are intended to provide a brief, general description of a suitable computing environment in which the embodiments described herein may be implemented. Generally, program modules include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, network appliances, and the like. The embodiments described herein may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for practicing the embodiments presented herein will be described. It should be appreciated that although the embodiments described herein are discussed in the context of a desktop or server computer, any type of computing device may be utilized. FIG. 1 shows an illustrative computer architecture for a computer system 100 that is operative to initiate an operating system boot from firmware. The blocks of FIG. 1 are intended to represent functional components of the computer architecture and are not intended to necessarily represent individual physical components. Functional components described may be combined, separated, or removed without departing from the overall sense and purpose of the computer architecture.

In order to provide the functionality described herein, the computer system 100 includes a baseboard, or "motherboard", which is a printed circuit board to which a multitude of components or devices may be connected by way of a system bus or other communication path. In one illustrative embodiment, a central processing unit (CPU) 102 operates in conjunction with a chipset 104. The CPU 102 may be a standard central processor that performs arithmetic and logical operations necessary for the operation of the computer. The CPU 102, in this and other embodiments, may include one or more of a microprocessor, a microcontroller, a field programmable gate array (FPGA), a complex programmable logic device (CPLD), an application specific integrated circuit (ASIC), and/or any other electronic computing device.

The chipset 104 includes a northbridge 106 and a southbridge 108. The northbridge 106 provides an interface between the CPU 102 and the remainder of the computer system 100. The northbridge 106 also provides an interface to one or more random access memories (RAM) used as a main memory 114 in the computer system 100 and, possibly, to an on-board graphics adapter 112. The northbridge 106 may also enable networking functionality through a gigabit Ethernet adapter 110. The gigabit Ethernet adapter 110 is capable of connecting the computer system 100 to one or more other computers via a network. Connections that may be made by the adapter 110 may include local area network (LAN) or wide area network (WAN) connections, for example. LAN and WAN networking environments are commonplace in offices, enterprise-wide computer networks, intranets, and on the Internet. The northbridge 106 is connected to the southbridge 108.

The southbridge 108 is responsible for controlling many of the input/output functions of the computer system 100. In particular, the southbridge 108 may provide one or more universal serial bus (USB) ports 116, a sound adapter 124, an Ethernet controller 134, and one or more general purpose input/output (GPIO) pins 118. The southbridge 108 may also provide a bus for interfacing peripheral card devices such as a BIOS boot specification (BBS) compliant SCSI host bus adapter 130. In one embodiment, the bus comprises a peripheral component interconnect (PCI) bus. The southbridge 108 may also provide a system management bus 132 for use in managing the various components of computer system 100. Power management circuitry 126 and clock generation circuitry 128 may also be utilized during operation of the southbridge 108.

The southbridge 108 is also operative to provide one or more interfaces for connecting mass storage devices to the computer system 100. For instance, according to an embodiment, the southbridge 108 includes a serial advanced technology attachment (SATA) adapter for providing one or more serial ATA ports 120 and an ATA100 adapter for providing one or more ATA100 ports 122. The serial ATA ports 120 and the ATA100 ports 122 may be, in turn, connected to one or more mass storage devices storing an operating system, application programs, and other data. As known to those skilled in the art, an operating system comprises a set of programs that control operations of a computer and allocation of resources. An application program is software that runs on top of the operating system software, or other runtime environment, and uses computer resources to perform application specific tasks desired by a user of the computer system 100.

The mass storage devices connected to the southbridge 108 and the SCSI host bus adapter 130, and their associated computer-readable media, provide non-volatile storage for the computer system 100. Although the description of computer-readable media contained herein refers to a mass storage device, such as a hard disk or CD-ROM drive, it should be appreciated by those skilled in the art that computer-readable media can be any available media that can be accessed by the computer system 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

A low pin count (LPC) interface may also be provided by the southbridge 108 for connecting a Super I/O device 138. The Super I/O device 138 is responsible for providing a number of input/output ports, including a keyboard port, a mouse port, a serial interface, a parallel port, and other types of input/output ports. The LPC interface or another interface may be utilized to connect a computer storage medium such as a ROM or a non-volatile random access memory (NVRAM) 137 such as a flash memory. The computer storage medium may be used for storing the firmware 136 that includes modules containing instructions and data that help to startup the computer system 100 and to transfer information between elements within the computer system 100.

The firmware 136 may include program code that is compatible with the EFI specification. It should be appreciated that in addition to the firmware 136 including an EFI-compatible firmware, other types and combinations of firmware may be included. For instance, the firmware 136 may include additionally or alternatively a BIOS firmware and/or other type of firmware known to those in the art. Additional details regarding the operation of the EFI firmware 136 are provided below with respect to FIGS. 2 and 3. It should be appreciated that the computer system 100 may not include all of the components shown in FIG. 1, may include other components that are not explicitly shown in FIG. 1, or may utilize an architecture completely different than that shown in FIG. 1.

Figure 2:
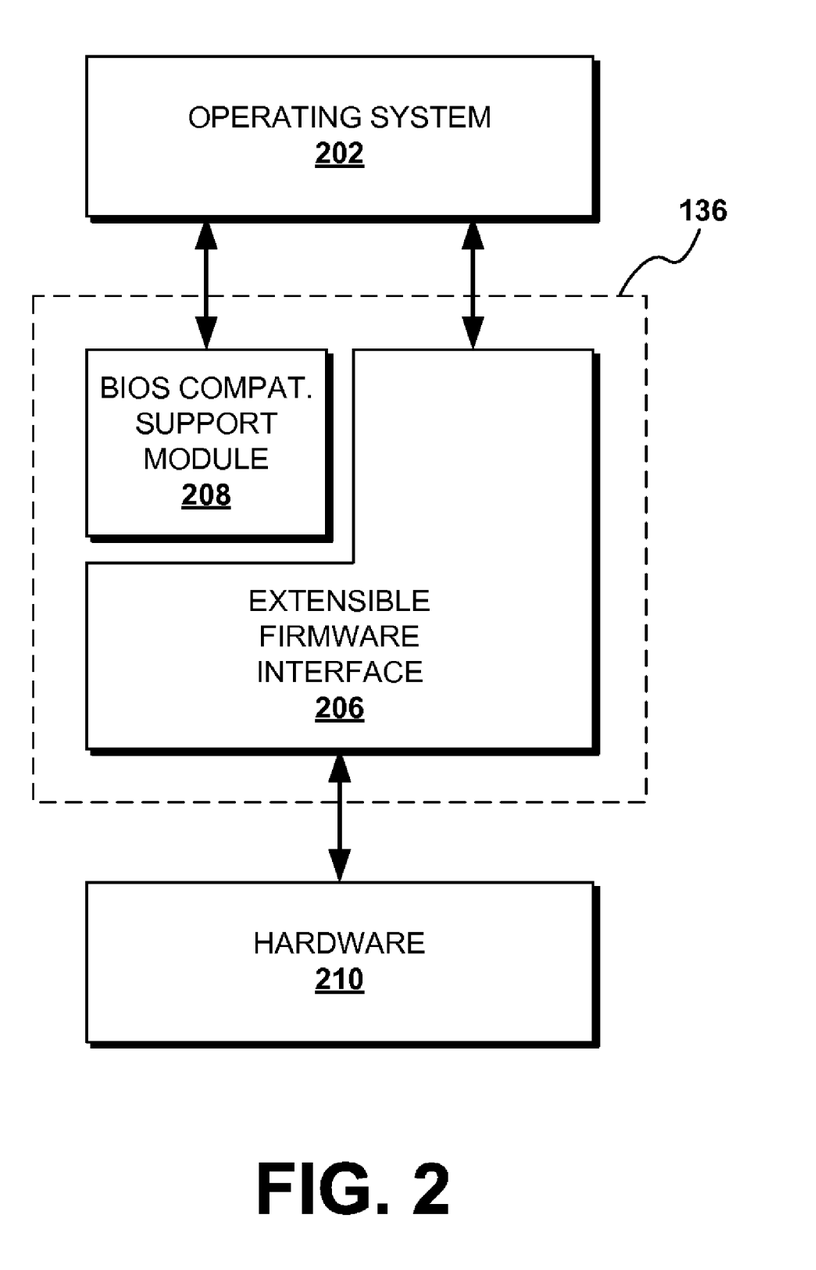
FIGS. 2 and 3 are software architecture diagrams that illustrate aspects of an Extensible Firmware Interface (EFI) environment that may be utilized according to embodiments.

Referring now to FIG. 2, additional details regarding the operation of the EFI firmware 136 of the computer system 100 will be described. In most computing systems, low-level instruction code is used as an intermediary between the hardware components of the computing system and the operating system 202 and other high-level software executing on the computing system. This low-level instruction code may, for example, be BIOS, EFI, or a hybrid of the two. BIOS in particular may provide a set of software routines that, among other things, allows higher-level software to interact with the hardware 210 of the computing system using standard calls.

A new specification for creating the firmware that is responsible for booting the computer and for intermediating the communication between the operating system 202 and the hardware has been created. The specification is called the Extensible Firmware Interface (EFI) specification, which was originally created by INTEL CORPORATION and which has been extended by the UNIFIED EXTENSIBLE FIRMWARE INTERFACE FORUM (UEFI). The EFI specification describes an interface 206 to be used by the operating system 202 to access the hardware 210 via the firmware 136. In particular, the specification defines the interface that platform firmware must implement and the interface that the operating system 202 may use in booting and accessing hardware. How the firmware 136 implements the interface 206 is left up to the manufacturer of the firmware. The EFI specification provides interfaces for EFI drivers to communicate with each other, and the EFI core provides functions such as allocation of memory, creating events, setting the clock, and many others.

According to one implementation of EFI, both the EFI 206 and a BIOS compatibility support module (CSM) 208 may be present in the firmware 136. This allows for a heterogeneous environment of operating systems and device drivers that may only support either EFI or BIOS interfaces. The CSM 208 may enable operating systems and applications to make legacy BIOS function calls. Additional details regarding the architecture and operation of the EFI 206 are provided below with respect to FIG. 3. Moreover, additional details regarding the operation and architecture of the EFI 206 can be found in either version 1.10 of the EFI specification available from INTEL CORPORATION and/or version 2.0 of the UEFI specification available from the UEFI FORUM.

Figure 3:
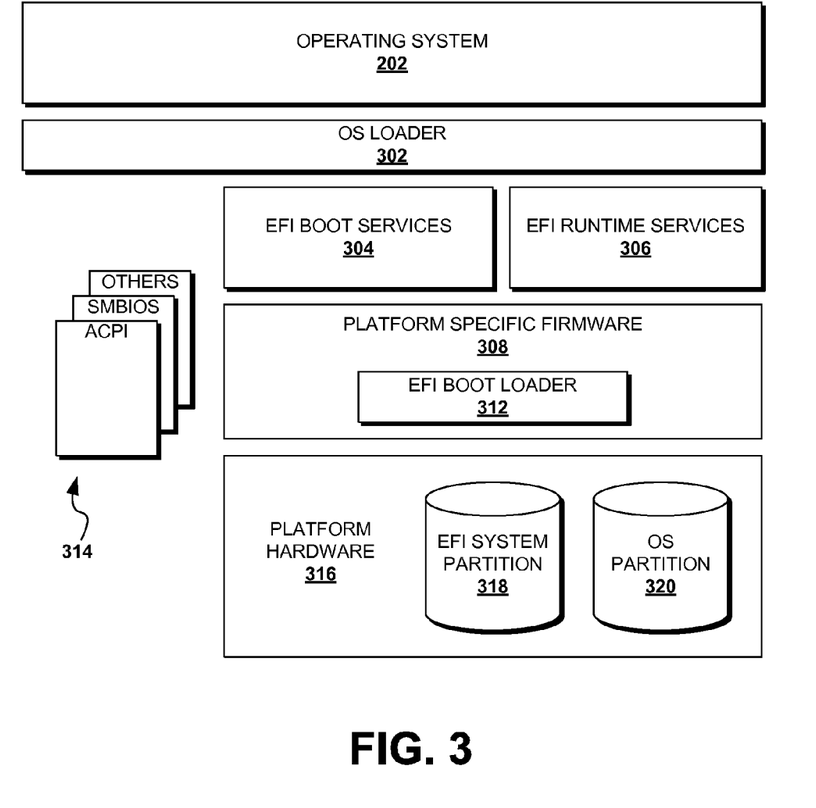

Turning now to FIG. 3, additional details regarding an EFI specification-compliant system that may be utilized to provide an operating environment for the various implementations presented herein will be described. As shown in FIG. 3, the system includes a platform hardware 316 and an operating system (OS) 202. A platform firmware 308 may retrieve OS program code from the EFI system partition 318 using an OS loader 302, sometimes referred to as a boot loader or an OS boot loader. Likewise, the OS loader 302 may retrieve OS program code from other locations, including from attached peripherals or from the firmware 136 itself. The EFI system partition 318 may be an architecturally shareable system partition. As such, the EFI system partition 318 defines a partition and file system that are designed to allow safe sharing of mass storage between multiple vendors. An OS partition 320 may also be utilized.

Once started, the OS loader 302 continues to boot the complete operating system 202, potentially loading the operating system in stages, as with the GRUB, commonly associated with Linux operating systems. The OS loader 302 may use EFI boot services 304 and interface to other supported specifications to survey, comprehend, and initialize the various platform components and the operating system 202 software that manages them. Thus, interfaces 314 from other specifications may also be present on the system. For example, the Advanced Configuration and Power Management Interface (ACPI) and the System Management BIOS (SMBIOS) specifications may be supported.

EFI boot services 304 provide interfaces for devices and system functionality that can be used during boot time. EFI runtime services 306 are available to the OS loader 302 during the boot phase and to an operating system 202 when it is running. For example, runtime services may be presented to ensure appropriate abstraction of base platform hardware resources that may be needed by the operating system 202 during its normal operation. EFI allows extension of platform firmware by loading EFI drivers and EFI application images which, when loaded, have access to all EFI-defined runtime and boot services.

Various program modules provide the boot and runtime services. These program modules may be loaded by the EFI boot loader 312 at system boot time. The EFI boot loader 312 is a component in the EFI firmware that determines which program modules should be explicitly loaded and when. Once the EFI firmware is initialized, it passes control to the boot loader 312. The boot loader 312 is then responsible for determining which of the program modules to load and in what order. It should be appreciated that both the operating system 202 and the firmware 136 provide a runtime environment for application programs as described herein.

Figure 4:
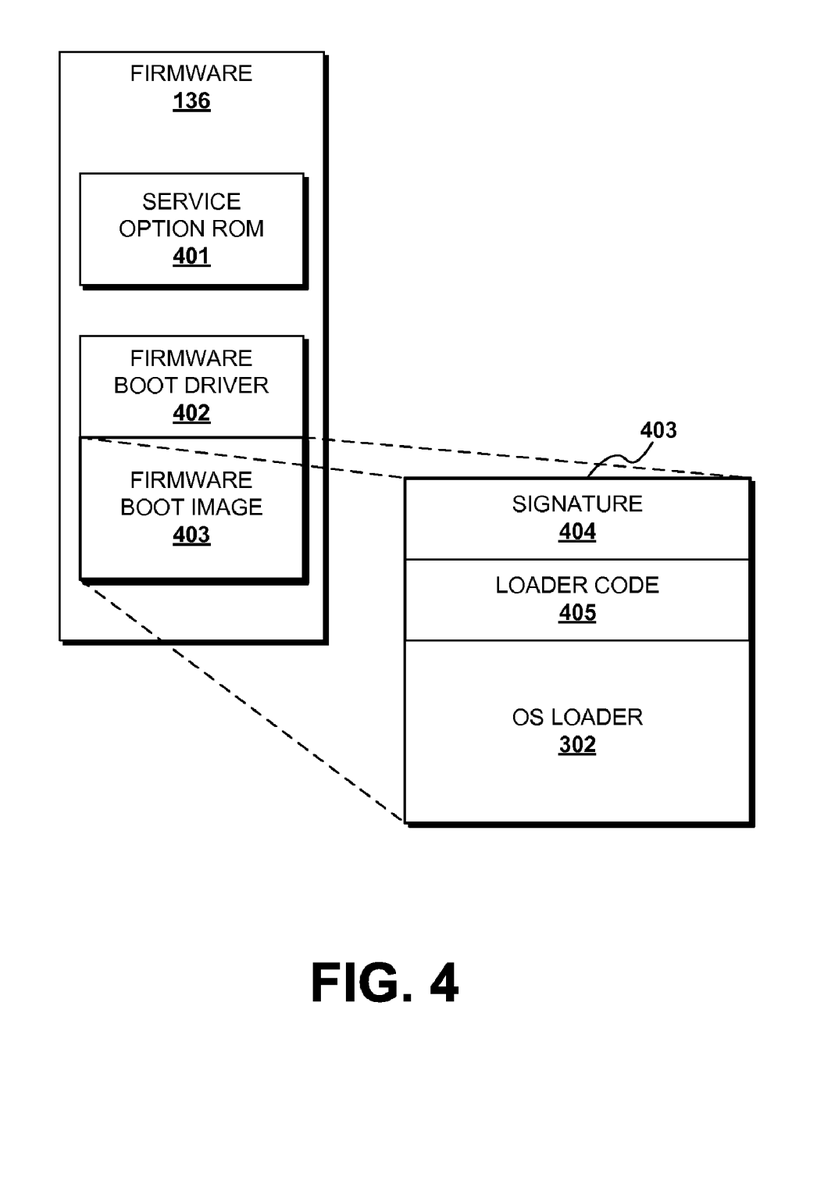
FIG. 4 is a memory map depicting firmware boot code stored in a computer firmware according to one or more embodiments.

FIG. 4 is a memory map depicting partial contents of the firmware 136 according to one or more embodiments. Other embodiments may take a different form than that depicted in FIG. 4, yet remain within the scope of the appended claims. Stored within the firmware 136 are a service option ROM 401, a firmware boot driver 402, and a firmware boot image 403. Upon startup of the computer system 100, the service option ROM 401 is loaded, thereby indicating the availability of a firmware boot, possibly to be invoked by a user utilizing a setup menu. For example, at startup, the computer system 100 may display a list of available IPL devices (e.g., hard drive, floppy drive, or network). The service option ROM 401 may be detected during Power-On Self Test (POST), and the firmware boot option may then be added to the list of available IPL devices, which a user may then select.

The service option ROM 401 includes a Plug and Play (PnP) expansion header which includes information about booting from firmware, including a boot entry vector (BEV) indicating a location for program code to boot from firmware. Further details about the service option ROM 410 are provided below with respect to FIG. 6. The firmware boot driver 402 stored in the firmware 136 is loaded along with other drivers during EFI initialization. After loading, the firmware boot driver 402 may create an event for signaling a firmware boot. When a user selects a firmware boot from a setup menu, or a firmware boot is otherwise signified (e.g., when no other IPL device is available), the notifier for the event triggers a load that copies the contents of the firmware boot image 403 into the main memory 114. At the point during startup at which the firmware 136 is ready to load an operating system 202, execution jumps to the loader code 403 within the firmware boot image 403. The loader code 403 loads the OS loader 302 to a specific address location and then jumps to that address location, initiating execution of the OS loader 302 code.

In the example of a Linux operating system being loaded, the OS loader 302 may be a version of GRUB. In a typical boot, GRUB is divided into stages which may be stored on a hard disk drive. The first stage of GRUB is typically a small program normally stored in the Master Boot Record (MBR) of a hard disk drive which, when loaded, serves to load one or more subsequent GRUB stages (e.g., the second stage) from other locations on the hard disk drive. Once loaded, GRUB can present options to a user for loading an operating system 202, and then initiate and manage loading of the operating system from a particular location.

In a firmware boot using the GRUB example, all GRUB stages are sourced from the firmware 136 and loaded as part of the OS loader 302 binary by the loader code 403. The GRUB loader may be modified in order to, for example, prevent GRUB stage one from attempting to load GRUB stage two from a hard disk drive. The version of GRUB stored as part of the firmware boot image 403 may only include a stripped down version of GRUB stage one. When only GRUB stages one and two are present in the OS Loader 302, the loader code 403 may, for example, copy GRUB stage one from offset 0x200 within the firmware boot image 403 to memory location 0:7C00, and GRUB stage two from offset 0x400 to memory location 0:8000.

Once GRUB is loaded and begins executing, the user may be presented with a menu or other configuration screen permitting the user to control aspects of the operating system load, such as a source location from which the operating system 202 should be loaded. The operating system may be loaded, for example, from an external storage device, a USB drive, or even from the firmware 136 itself.

Figure 5:
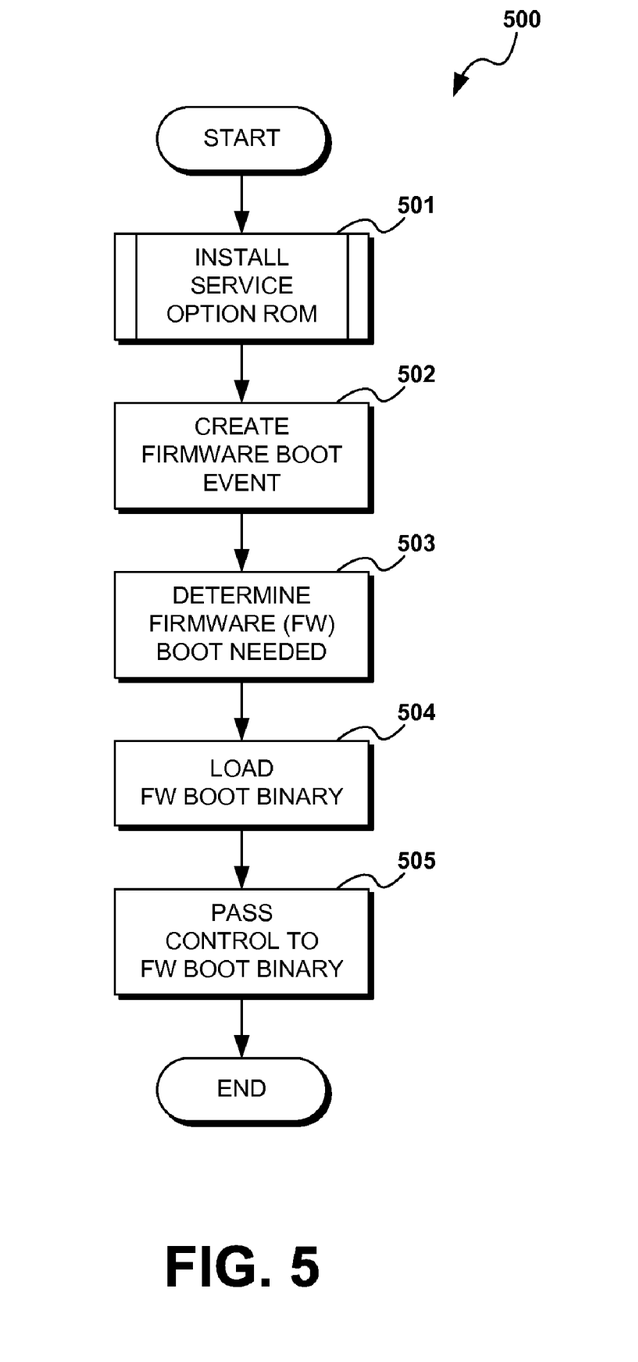
FIG. 5 is a flow diagram illustrating a process for booting a computer system from a firmware according to one or more embodiments.

FIG. 5 is a flow diagram illustrating an example of a process 500 for initiating an operating system boot from a firmware according to one or more embodiments. The logical operations of the various implementations presented, including those of FIGS. 5 and 6 may be (1) a sequence of computer-implemented acts or program modules running on the computer system 100 and/or (2) interconnected machine logic circuits or circuit modules within the computer system 100. The implementation is a matter of choice dependent on the performance requirements of the computer on which the embodiments are implemented. Accordingly, the logical operations making up the implementations are referred to variously as operations, structural devices, acts, or modules.

It will be recognized by one skilled in the art that these operations, structural devices, acts, and modules may be implemented in software, in firmware, in special purpose digital logic, and/or any combination thereof without deviating from the spirit and scope of the attached claims. Moreover, it will be apparent to those skilled in the art that the operations described may be combined, divided, reordered, skipped, and otherwise modified, also without deviating from the spirit and scope of the attached claims.

The process 500 begins at operation 501 early in the boot process of a computer system 100. The firmware 136 loads the service option ROM 401 from firmware into an area of main memory 114 where other option ROMs are loaded. This enables the service option ROM 401 to be located by executing power-on self test (POST) code and to identify a firmware boot as an available boot option. More information regarding the installation of the service option ROM 401 is presented below in the description accompanying FIG. 6. At operation 502, during initialization of the firmware boot driver 402, a firmware boot event is created. This event is triggered at operation 503 when it is determined that a firmware boot will be performed. The determination may be made through a selection of a firmware boot by a user utilizing an input device or configuration setting. Alternatively, the determination may be automatic when other boot devices are not able to serve as IPL devices, for example.

When the firmware boot event is triggered, the firmware boot image 403 is loaded into a portion of the main memory 114 at operation 504. Once the firmware boot image 403 is loaded, the normal startup procedure continues until the firmware 136 is prepared to boot the operating system 202. At operation 505, control is transferred to the loader code 403. The loader code 403 then proceeds to load the OS loader 302 and begin execution of the OS loader 302.

Figure 6:
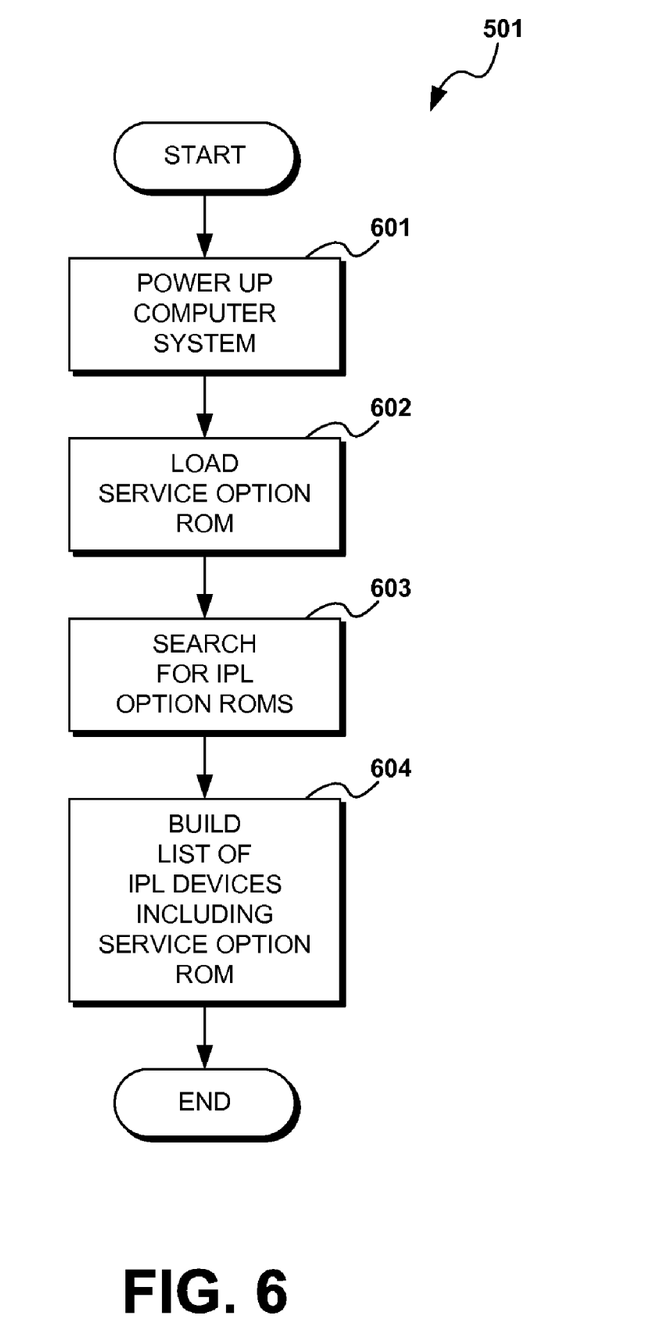
FIG. 6 is a flow diagram illustrating a process for installing a service option ROM according to one or more embodiments.

FIG. 6 is a flow diagram illustrating an example of a process 600 for installing a service option ROM 401 in a computer system. The process 600 begins at operation 601 when the computer system 100 is powered up or reset and the firmware 136 begins identifying and initializing components within the computer. At operation 602, using the example of the BIOS Boot Specification (BBS), the CSM 208 loads the service option ROM 401 from firmware 136 along with other hardware option ROMs into a portion of memory as defined by the BBS. This portion of memory may be defined as being between 0xC0000h and 0xEFFFFh. The service option ROM 401 includes a PnP expansion header that provides information about the service option ROM, including a text description for use in a configuration listing and a boot entry vector indicating a memory address for starting a firmware boot.

At this point, the firmware 136 searches the portion of memory for the option ROMs at operation 603. This search may be conducted by looking for a particular signature in each option ROM, as set forth in the BBS. Some option ROMs, including the service option ROM 401, correspond to initial program load IPL devices, which can be used to boot an operating system 202 onto the computer system 100. At operation 604, as the IPL devices are discovered in this fashion, the firmware 136 builds a table of all IPL devices. The IPL table includes an entry with the information about the firmware boot retrieved from the service option ROM.

Although the subject matter presented herein has been described in conjunction with one or more particular embodiments and implementations, it is to be understood that the invention defined in the appended claims is not necessarily limited to the specific structure, configuration, or functionality described herein. Rather, the specific structure, configuration, and functionality are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A method for booting an operating system utilizing a firmware in a computer system, the method comprising:
    installing a service option read-only memory (ROM) in a memory of the computer system, wherein the service option ROM includes program code for booting an operating system utilizing the firmware;
    retrieving a boot loader driver for the operating system from the firmware, wherein the boot loader driver is associated with an operating system boot loader stored in the firmware;
    adding identifying information for the boot loader driver to a list of initial program load (IPL) devices;
    displaying the list of available IPL devices with the identifying information for the boot loader driver;
    receiving a selection of the boot loader driver;
    copying the boot loader driver to the memory of the computer system; and
    executing the operating system boot loader.

2. The method of claim 1, wherein the operating system boot loader comprises a version of a Grand Unified Bootloader (GRUB).

3. The method of claim 1, further comprising:
    copying a loader code from the firmware to the memory; and
    executing the loader code in order to load the operating system boot loader.

4. The method of claim 1, wherein the operating system boot loader is executed in response to receiving the selection of the boot loader driver.

5. A non-transitory computer storage medium having computer-executable instructions stored thereon for booting an operating system from a firmware which, when executed by a computer, cause the computer to:

load a service option read-only memory (ROM) from the firmware to a memory of a computer system, wherein the service option ROM indicates that a firmware boot is available and includes a boot entry vector;

execute program code stored at a location indicated by the boot entry vector upon determining that the firmware boot is needed;

display a list of available initial program load (IPL) devices, wherein the list of available IPL devices includes a firmware boot;

receive a selection of the firmware boot;

in response to determining that a firmware boot is requested, copy an operating system boot loader from the firmware to the memory of the computer system; and     execute the operating system boot loader.

6. The computer storage medium of claim 5, wherein the service option ROM comprises a Plug and Play expansion header.

7. The computer storage medium of claim 5, wherein the operating system boot loader comprises a version of a Grand Unified Bootloader (GRUB).

8. The computer-readable storage medium of claim 5, wherein the operating system boot loader is executed in response to receiving the selection of the firmware boot.

9. The computer-readable storage medium of claim 5, further comprising computer-executable instructions that, when executed by the computer, cause the computer to:

copy loader code from the firmware to the memory; and execute the loader code to load the operating system boot loader.

10. A non-transitory computer storage medium having computer-executable instructions stored thereon for booting an operating system on a computer system from a firmware, the computer storage medium storing modules comprising:

a service option ROM comprising a boot entry vector indicating a location for initiating a firmware boot and a text identifier for a firmware boot;

a firmware boot driver for creating a firmware boot event, copying the operating system boot loader from the firmware to a memory in the computer system, and copying a signature from the firmware to the memory, wherein the firmware boot event is triggered when a firmware boot is requested from a list of initial program load (IPL) devices; and     an operating system boot loader.

11. The computer storage medium of claim 10, wherein the operating system boot loader comprises a version of a Grand Unified Bootloader (GRUB).

12. The computer storage medium of claim 10, wherein the computer-readable storage device comprises at least one of:

a non-volatile memory device;

a volatile memory device; or a mass storage device.

13. The computer storage medium of claim 10, wherein the service option ROM further comprises a Plug and Play (PnP) expansion header.

14. The computer-readable storage medium of claim 10, further comprising computer-executable instructions that, when executed by the computer, cause the computer to:

copy loader code from the firmware to the memory; and execute the loader code to load the operating system boot loader.

\* \* \* \* \*